US006697246B2

(12) United States Patent
Huang

(10) Patent No.: US 6,697,246 B2
(45) Date of Patent: Feb. 24, 2004

(54) OVERLOAD PROTECTOR STRUCTURE OF EXTENSION CORD RECEPTACLE

(75) Inventor: Chyong-yen Huang, Taipei (TW)

(73) Assignee: Atom Technology Inc., Taipei (TW)

( * ) Notice: Subject to any disclaimer, the term of this patent is extended or adjusted under 35 U.S.C. 154(b) by 332 days.

(21) Appl. No.: 09/862,606

(22) Filed: May 23, 2001

(65) Prior Publication Data

US 2002/0176217 A1 Nov. 28, 2002

(51) Int. Cl.$^{7}$ .................................................. H02H 5/04
(52) U.S. Cl. .......................................... 361/103; 337/68
(58) Field of Search .............................. 200/51; 337/56, 337/66, 68, 75; 361/103; 439/650, 652

(56) References Cited

U.S. PATENT DOCUMENTS 4,814,739 A * 3/1989 Moldovan .................... 337/68
5,248,954 A * 9/1993 Chiang ........................ 337/66
5,526,225 A * 6/1996 Wang ......................... 361/643
6,229,105 B1 * 5/2001 Huang ...................... 200/16 R

* cited by examiner

*Primary Examiner*—Gregory J. Toatley, Jr.
*Assistant Examiner*—Boris Benenson
(74) *Attorney, Agent, or Firm*—Rosenberg, Klein & Lee

(57) ABSTRACT

The present invention relates to an overload protector structure of an extension cord receptacle that mainly comprised a fire wire conducting plate of a switching unit (or a receptacle unit) connected with an overload protector in the extension cord receptacle to extend properly, the overload protector has a housing member, a power input plate exposed at the said housing member, a temperature sensing plate is fixedly connected to an inner end of the power input plate, the said overload protector further penetrates outward through a slot channel from a contact point, the fire wire conducting plate can fitly extend into the said slot channel and contacts with the contact point of the temperature sensing plate, thereby, the effectiveness of rapid connection and eliminating the soldering joint point is possessed between the overload protector and the switch unit (or the receptacle unit).

5 Claims, 12 Drawing Sheets

OVERLOAD PROTECTOR STRUCTURE OF EXTENSION CORD RECEPTACLE

BACKGROUND OF THE INVENTION

1) Field of the Invention

The present invention relates to an overload protector structure of an extension cord receptacle, more especially an overload protector structure that simplifies the joint point structure of an overload protector and provides a simple connecting method to enable the overload protector to be rapidly assembled in the extension cord receptacle and to reduce the number of the soldering joint points.

2) Description of the Prior Art

Accordingly, seat bodies of available extension cord receptacles usually provide multiple receptacles for plugging the plugs (some extension cord receptacles have additional switches for controlling the on/off of the power). That not only effectively extends the supply of the power, but also divides the original single receptacle into multiple receptacles so that the power can be supplied to more electrical products. However, too many plugs plugged together in one extension cord receptacle might inevitably increase the load of the extension cord receptacle and tend to over load the current. Hence, some extension cord receptacles have an overload protector disposed in the structure thereof. Once the current for using on the extension cord receptacle exceeds the preset value and cases the temperature of the circuit to rise, the said overload protector can break off the circuit automatically and cut off the power supply to avoid danger. When the operating temperature of the extension cord receptacle recovers to the normal value, the overload protector can connect the circuit for normal operation automatically again. The allocation of the overload protectors of most of the available extension cord receptacles is shown in FIGS. 11 and 12, wherein a receptacle (91) and a switch (92) are embedded in an upper housing member (90) of an extension cord receptacle (9) in order. An overload protector (93) is mounted at a distal end of a power line (94), the said overload protector (93) comprises a power input plate (931), a power output plate (932) and a press-button (933). In assembling, a fire wire (941) in a power line (94) is soldered to the power input plate (931) of the overload protector (93). A shortcut conducting wire (95) is soldered to the power output-plate (932) of the overload protector (93), the other end of the, said conducting wire (95) is soldered to a fire wire input end (921) of the switch (92). In addition, a ground wire (942) in the power line (94) is soldered directly to a ground wise end (922) of the switch (92). In operation, once the operating temperature exceeds the preset value the overload protector (93) will cut off the circuit automatically and the press-button (933) will be in an ejected state. After the operating temperature of the extension cord receptacle (9) recovers to the normal temperature, the press-button (933) can be depressed to resume and the overload protector (9) will conduct the circuit again. However, the mentioned conventional structure has at least the following disadvantages:

1. Since too many soldering joints are produced for disposing the overload protector (93), as shown in FIG. 12, four soldering joints (99A, 99B, 99C, 99D) are required between the power line (94) as well as the overload protector (93) of the extension cord receptacle (9) and the switch (92). So many soldering points (99A, 99B, 99C, 99D) not only increase the difficulty and time in assembling, but also make the QC (Quality Control) workers spend more time in inspecting all the soldering joints (99A, 99B, 99C, 99D) one by one. And so many soldering joints (99A, 99B, 99C, 99D) might increase the probability of defects of the product due to the imperfect soldering joints (99A, 99B, 99C, 99D) and that is unfavorable for enhancing the good yield ratio of the product.
2. The overload protector (93) is presented as a separate unit linked with the switch (92) via the conducting line (95). Therefore the overload protector (93) occupies a certain space in the extension cord receptacle (9) and that is unfavorable for designing a light, thin, short and small extension cord receptacle (9).
3. The overload protector (93) is an independent component difficult to be further simplified with fixed components as well as assembly cost and is not a starting point for saving the manufacturing cost.
4. The overload protector (93) and the switch (92) are soldered to connect via the conducting line (95) and they might split to separate from each other.

SUMMARY OF THE INVENTION

The design of the present invention is to efficiently improve the mentioned disadvantages, mainly to simplify the joint point structure of the overload protector and provide an easy connection method for enabling the overload protector to be assembled rapidly in the extension cord receptacle and for reducing the number of the soldering joints. It is mainly to enable the fire wire conducting plate of the switch unit (or the receptacle unit) connected to the overload protector in the extension cord receptacle to extend properly. The overload protector has a housing member which is connected with the switch unit (or the receptacle unit). The overload protector has a power input plate exposed at the housing member thereof with a temperature sensing plate fixedly connected at an inner end of the power input plate. The other end of the temperature sensing plate is a free end with a contact point thereat. The said overload protector farther penetrates through a slot channel from the said contact point area, the fire wire conducting plate can fitly extend into the said slot channel for positioning and contacts with the contact point of the temperature sensing plate. The said temperature sensing plate contacts with the fire wire conducting plate in a normal state and will stick upward to bend and separate from the fire wire conducting plate when the current is overloaded. Thereby the connection between the overload protector and the switch can be simplified and faster and the soldering joints can be eliminated completely.

The present invention will be described in detail in conjunction with the drawings as follows.

DETAILED DESCRIPTION OF PREFERRED EMBODIMENTS

Figure 1:
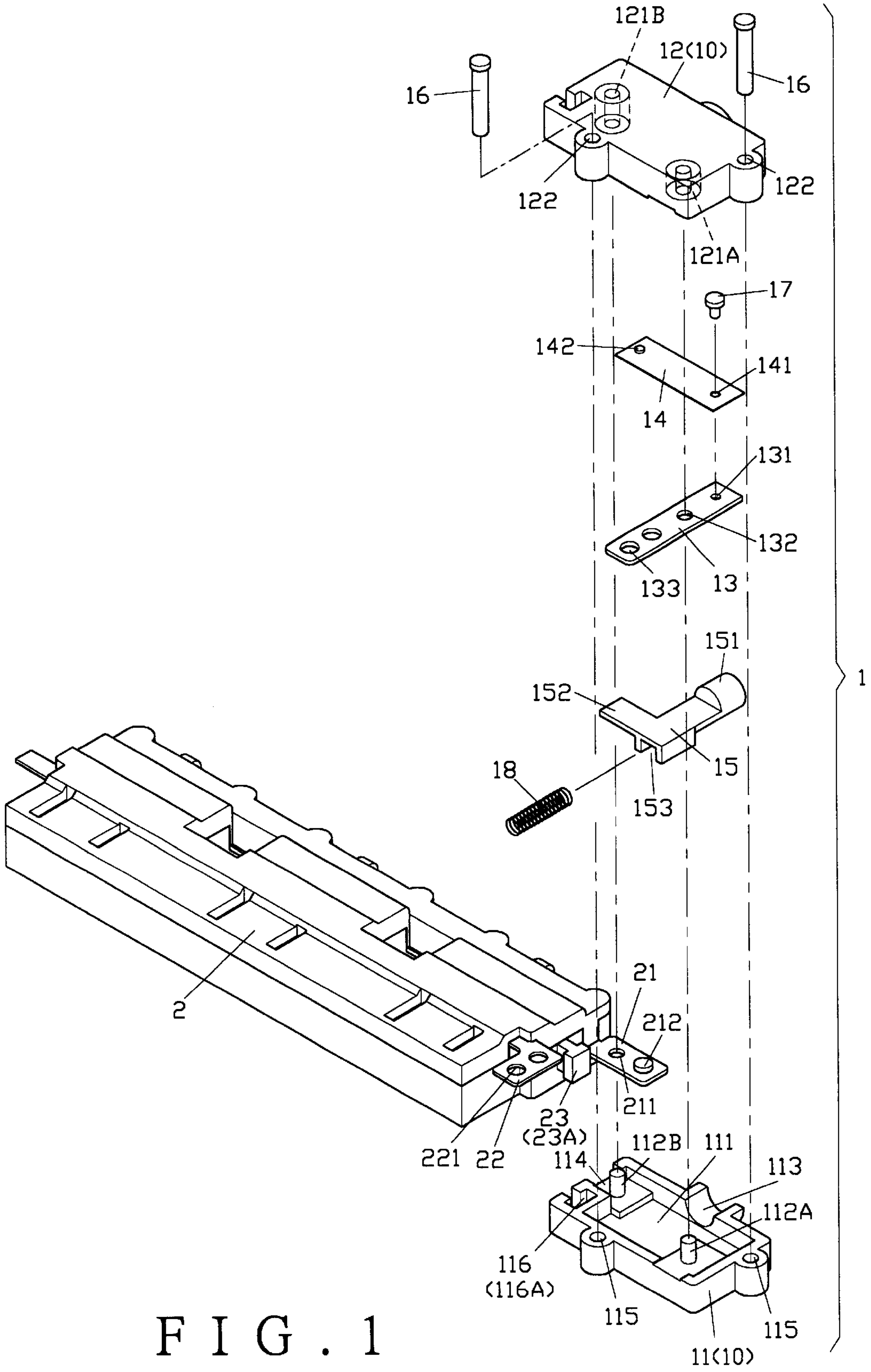
FIG. 1 is an exploded view of the components of the present invention.

FIG. 1 shows one of the embodiments of the present invention, an overload protector (1) comprises of a housing member (10), a power input plate (13), a temperature sensing plate (14) and a press-button (15) with work elastic force.

The housing member (10) comprises a lower housing seat (11) and an upper housing seat (12). The lower housing seat (11) has a concave space (111) for accommodating a power input plate (13), a temperature sensing plate (14) and a press-button (15) thereafter. The lower housing seat (11) further has two convex columns (112A, 112B) disposed therein, a channel (113) for a press section (151) of a press-button (15) to be installed thereafter to extend outside the lower housing seat (11), and a slot channel (114) for a fire wire conducting plate (21) of an external component to be inserted for assembling. A plurality of conjoining holes (115) are disposed on the wall area of the lower housing seat (11). In addition, the lower housing seat (11) further has a link section (116), the said link section (116) is an insert slot (116A) in this embodiment. The upper housing seat (12) is a housing member corresponding to the lower housing seat (11) with two column holes (121A, 121B) mounted correspondingly to the convex columns (112A, 112B) of the lower housing seat (11). A plurality of conjoining holes (122) are disposed for assembling with the lower housing seat (11) by means of conjoining components (16), such as the rivets.

The power input plate (13) is a long conducting plate with a riveting hole (131) disposed at one end of the power input plate (13). A position hole (132) is mounted near the riveting hole (131) and at least one or more linking holes (133) are disposed at the other end of the power input plate (13).

The temperature sensing plate (14) is a conducting plate (such as a dual metal plate) and is capable of being bent or deformed if overheated. The temperature sensing plate (14) has a riveting hole (141) at one end of the plate and can be riveted fixedly to the riveting hole (131) of the power input plate (13) by a rivet (17). A free end of the temperature sensing plate (14) has a contact point (142).

The press-button (15) has a press section (151), a sheet-shaped isolating end (152) and a slot (153) for accommodating a spring (18) to provide work elastic force.

In this example, a receptacle unit (2) coordinated with the present invention is designed as a connected-seat style. There are multiple sets of receptacles preset in the receptacle unit (2). The receptacle unit (2) has a fire wire conducting plate (21) extending outward and a ground wire conducting plate (22). The said fire wire conducting plate (21) has a position hole (211) and a contact point (212) and the ground wire conducting plate (22) has at least one or more linking holes (221). The receptacle unit (2) also has a linking section (23) corresponding to the linking section (116) of the housing member (10). The linking section (23) is a conjoining tenon (23A) in this embodiment.

Figure 2:
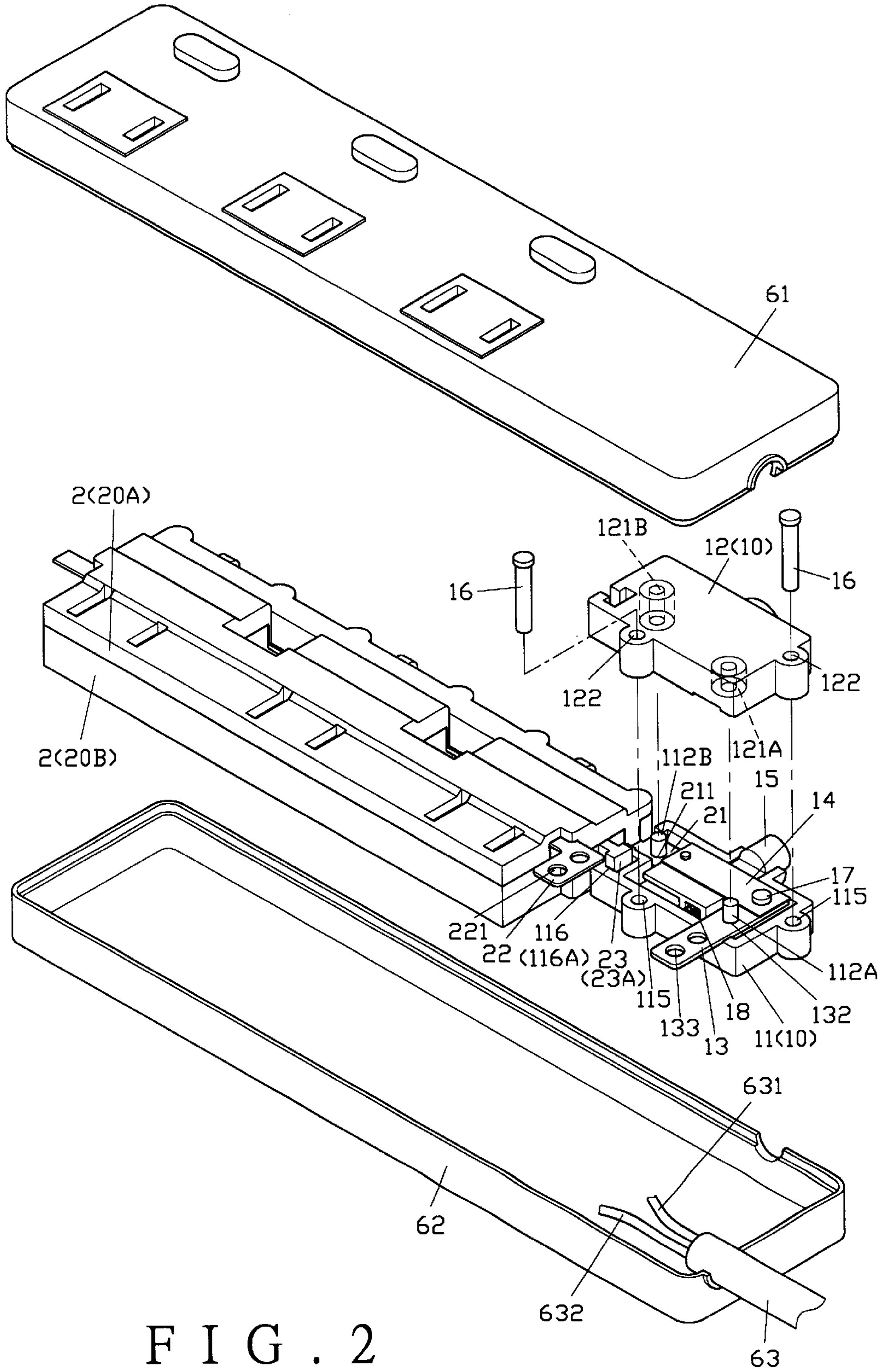
FIG. 2 is a schematic view of the assembled present invention.

In assembling, referring to FIGS. 1 and 2, the insert slot (116A) of the housing member (10) links with the conjoining tenon (23A) of the receptacle unit (2). The position hole (132) of the power input plate (13) is inserted into the convex column (112A) of the lower housing seat (11). The power input plate (13) with the linking hole (133) extends outward at the lower housing seat (11). The other end of the power input plate (13) is riveted to connect with the temperature sensing plate (14). The fire wire conducting plate (21) of the receptacle unit (2) is received in the slot channel (114) of the lower housing seat (11). A position hole (211) of the fire wire conducting plate (21) is fitly inserted into the convex column (112B) of the lower housing seat (11) for positioning, so that a contact point (212) of the fire wire conducting plate (21) is contacted normally by the free end of the temperature sensing plate (14). The press-button (15) is assembled at the lower aspect of the temperature sensing plate (14) with the press section (151) thereof exposed, and via the spring (18), the isolating end (152) possesses the storage elastic force pointing to the contact point (142) of the free end of the temperature sensing plate (14). Finally, the upper housing seat (12) covers over the lower housing seat (11), and then the assembly of the overload protector (1) is accomplished. The extension cord receptacle product can be formed hereafter by just covering an upper and a lower housing seats (61, 62) and soldering a power line (63).

Figure 3:
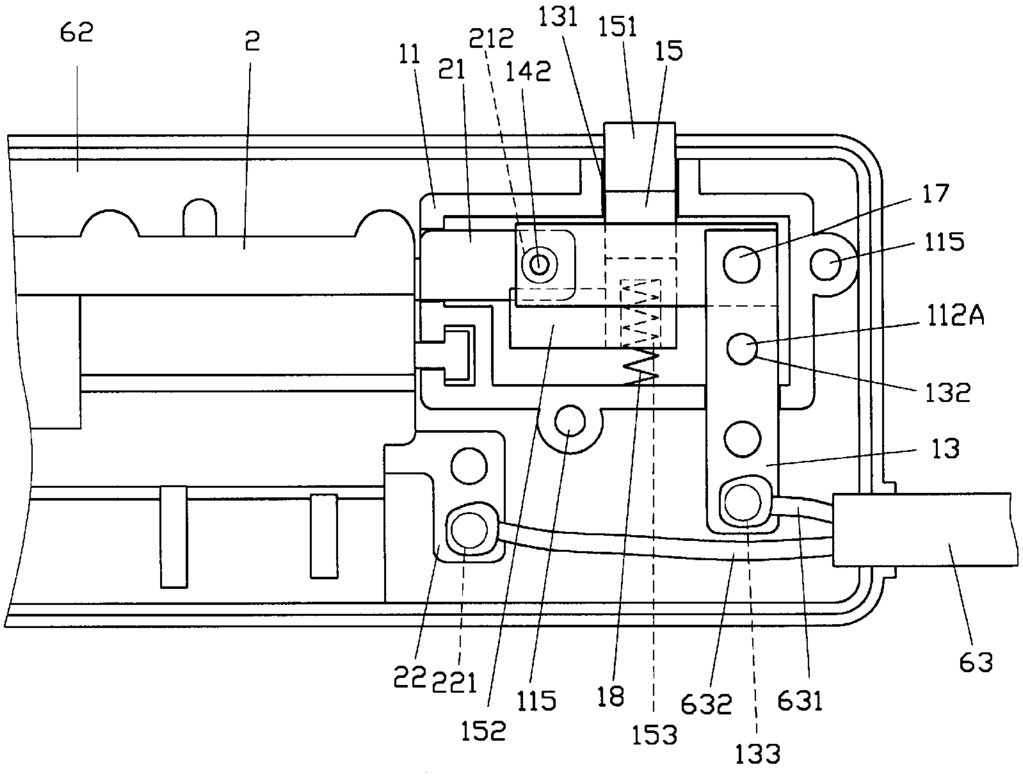
FIG. 3 is a schematic view of the contacted free end of the temperature sensing plate of the present invention.
Figure 4:
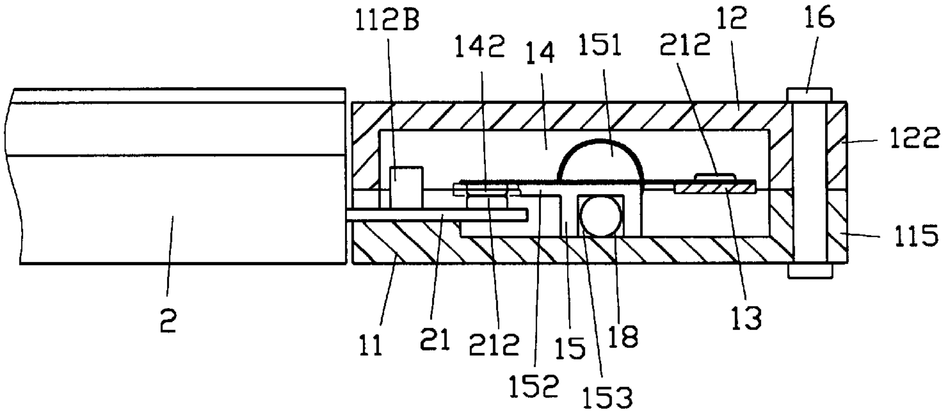
FIG. 4 is a cross-sectional view of the contacted free end of the temperature sensing plate of the present invention.

Refer to FIGS. 3 and 4, after the assembling, the connection of the receptacle unit (2) and the overload protector (1) is accomplished spontaneously without any additional soldering processing to be employed between them. At this time, the linking hole (133) on the power input plate (13) of the overload protector (1) is connected and soldered fixedly with an power fire wire (631) of the extension cord receptacle; while the linking hole (221) on the ground wire conducting plate (22) of the receptacle unit (2) is connected and soldered fixedly with a power ground wire (632) of the extension cord receptacle.

Figure 5:
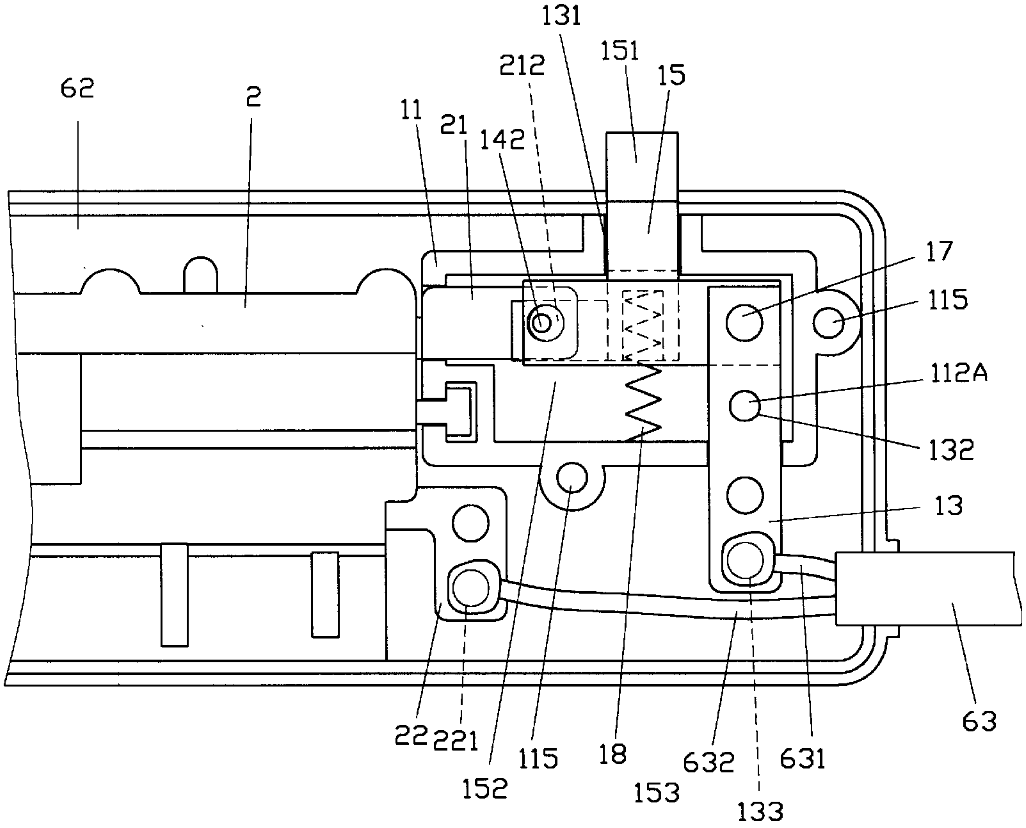
FIG. 5 is a schematic view of the stuck upward and bent free end of the temperature sensing plate of the present invention.
Figure 6:
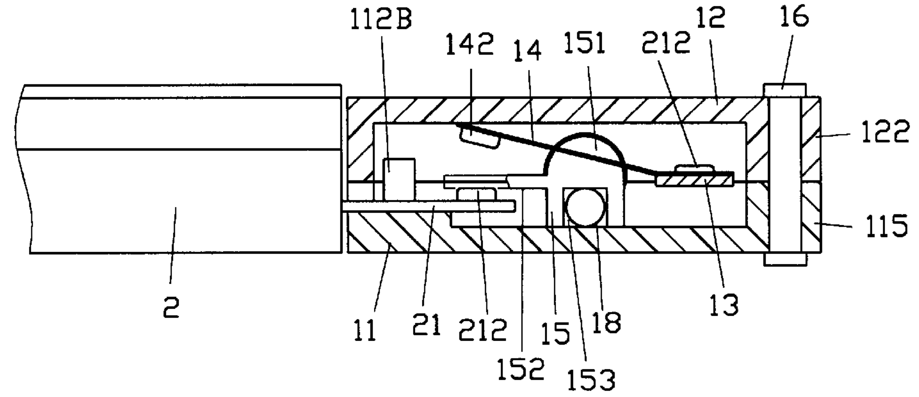
FIG. 6 is a cross-sectional view for the stuck upward and bent free end of the temperature sensing plate of the present invention.

Refer to FIGS. 5 and 6, in implementing, when the current is overloaded, the temperature sensing plate (14) sticks upward and the spring (18) drives the isolating plate (152) to displace and block at the contact point (142) of the free end of the temperature sensing plate (14) to cut off the fire wire path of the power. When the overload disappears and the operating temperature recovers normally, the temperature sensing plate (14) resumes accordingly; at this time, if the press-button (15) is depressed to resume the isolating plate (152) back to the position, the free end of the temperature sensing plate (14) will resume to the original state to recover the fire wire path of the power for conducting (as shown in FIGS. 3 and 4).

Figure 7:
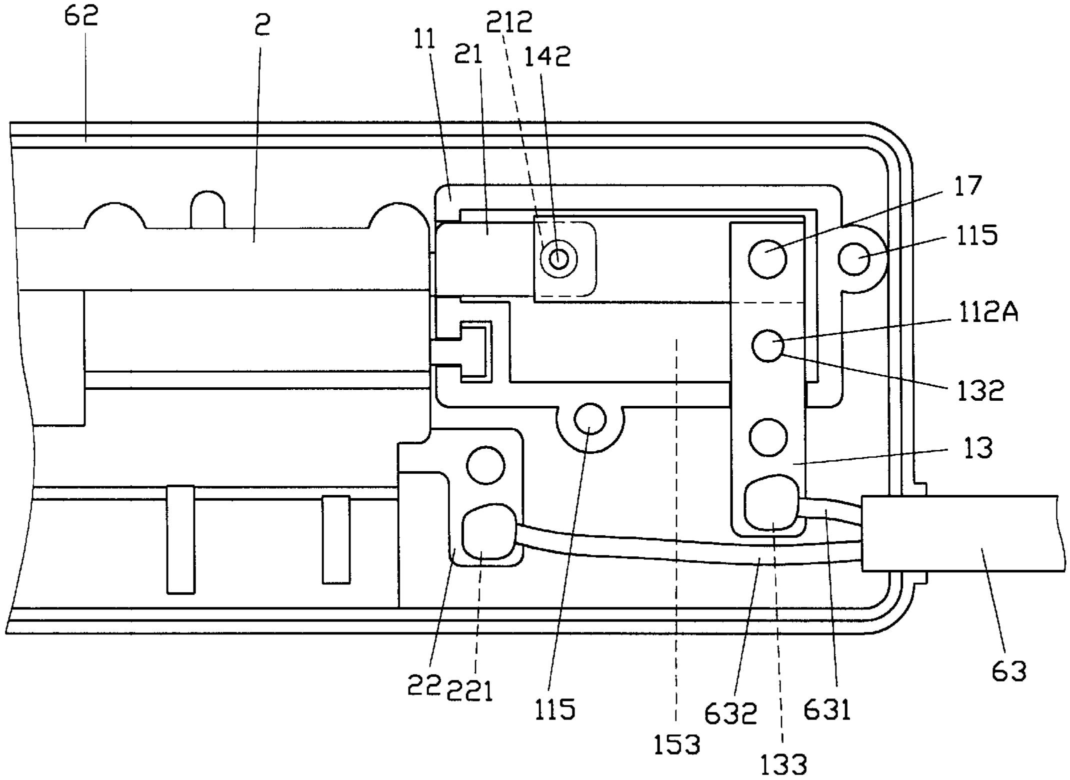
FIG. 7 is an exemplary variation of the present invention when the press-button and the spring are eliminated.

In the mentioned embodiment, the press-button (15) and the spring (18) in the overload protector (1) are optional components. Without the installation of the said two components, the present invention still can be implemented (as shown in FIG. 7), that is, when the current is overloaded, the temperature sensing plate (14) sticks upward to make the contact point (142) of the free end of the temperature sensing plate (14) separate from the contact point (212) of the fire wire conducting plate (21) of the receptacle unit (2) to form a shortage. When the overload disappears and the operating temperature recovers normally, the free end of the temperature sensing plate (14) will resume to its original status of a path.

Figure 8:
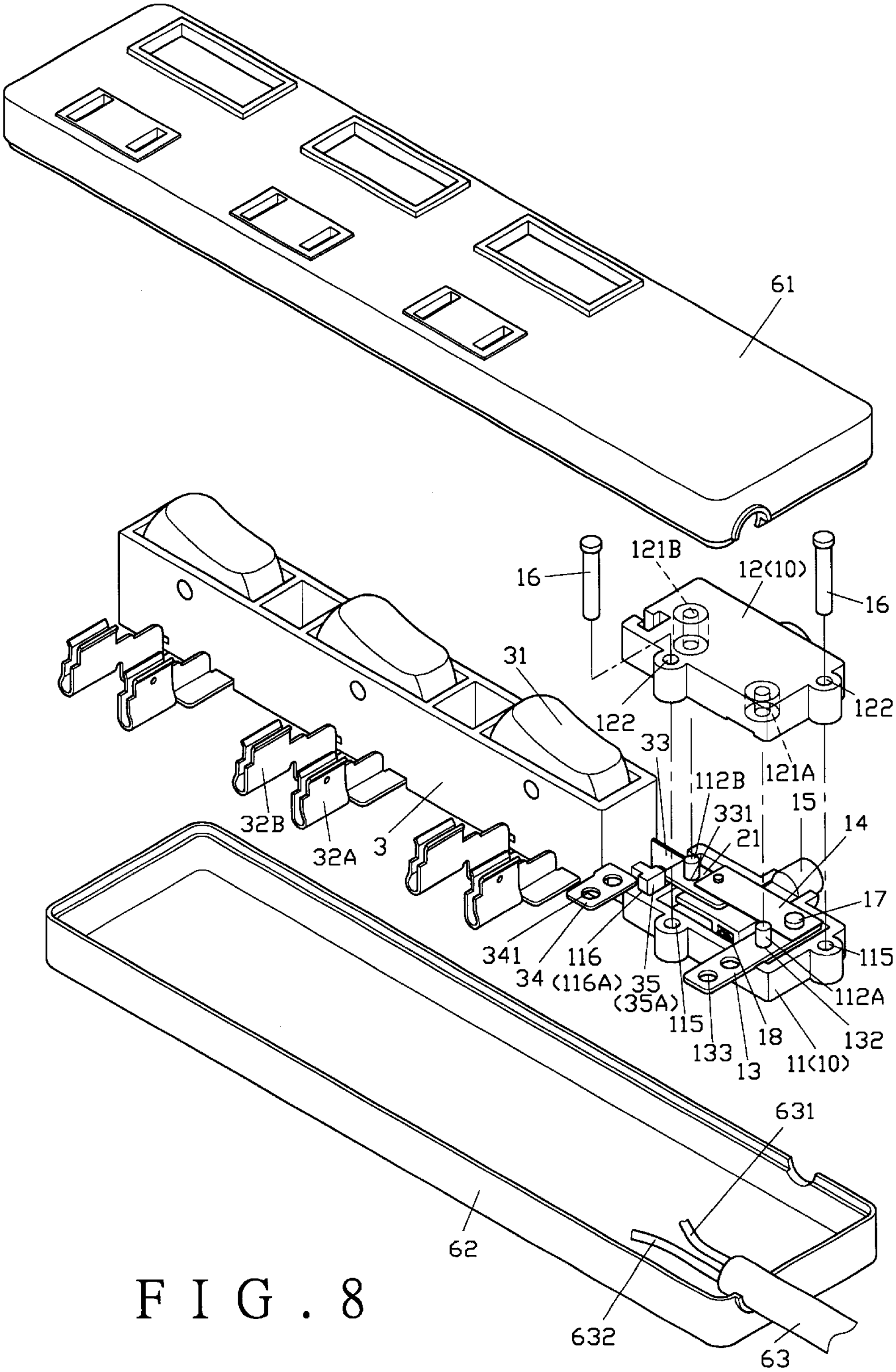
FIG. 8 is an exemplary embodiment view of the present invention applied to a switch receptacle unit.

Then, as another embodiment shown in FIG. 8, the receptacle unit (2) is replaced by a switch receptacle unit (3) in this example. The switch receptacle unit (3) has a plurality of switches (31). Each switch (31) has a set of receptacle conducting plates (32A, 32B) directly extended outward for the plugs to plug in, and each switch (31) can independently control the on/off status of the corresponding receptacle conducting plates (32A, 32B). In this example, the switch receptacle unit (3) has a fire wire conducting plate (33) extended outward and a ground wire conducting plate (34). The fire wire conducting plate (33) has a position hole (331) and a contact point (not shown in the Figure), and the ground wire conducting plate (34) has at least one or more linking holes (341). Additionally, the switch receptacle unit (3) also has a linking section (35) disposed correspondingly to the linking section (116) of the housing member (10). The linking section (35) is a conjoining tenon (35A) in this embodiment. The engagement between the overload protector (1) and the switch receptacle unit (3) is the same as the above example.

Figure 9:
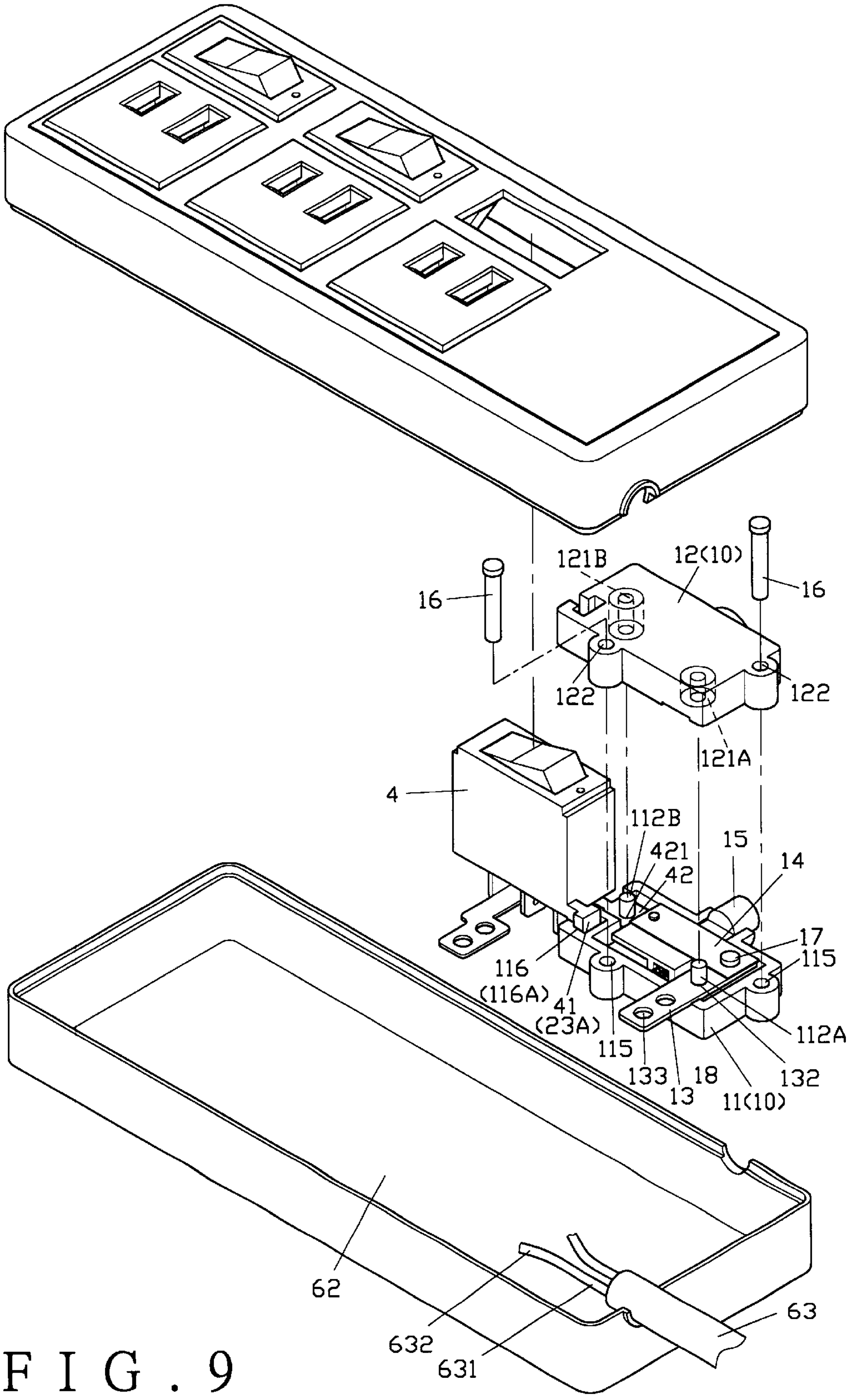
FIG. 9 is an exemplary embodiment view of the present invention applied to a single-seated switch unit.

In the embodiments shown in FIGS. 2 and 8, both the receptacle unit (2) and the switch receptacle unit (3) are presented as in a connected-seat style. For the receptacle or the switch not in a connected-seat style, (referring to FIG. 9), a linking section (41) is disposed on a housing member of a switch (4) (or a receptacle) connected to the overload protector (1), and a fire wire conducting plate (42) of the switch (4) (or the receptacle) connected to the overload protector (1) extends properly with a position hole (421) and a contact point (not shown in the Figure) formed at the extended end thereof, then the fire wire conducting plate (42) can be assembled coordinately in the overload protector (1) of the present invention to achieve the same efficiency.

The lower housing seat (11) and the upper housing seat (12) of the overload protector (1) in the present invention can be unitarily molded respectively to the upper and the lower housing members (20A, 20B) of the receptacle unit (2), (referring to FIG. 2), or the lower housing seat (11) and the upper housing seat (12) of the overload protector (1) can be unitarily molded respectively to the upper and the lower housing bodies (61, 62) of the extension cord receptacle as another feasible example for the present invention.

Figure 10:
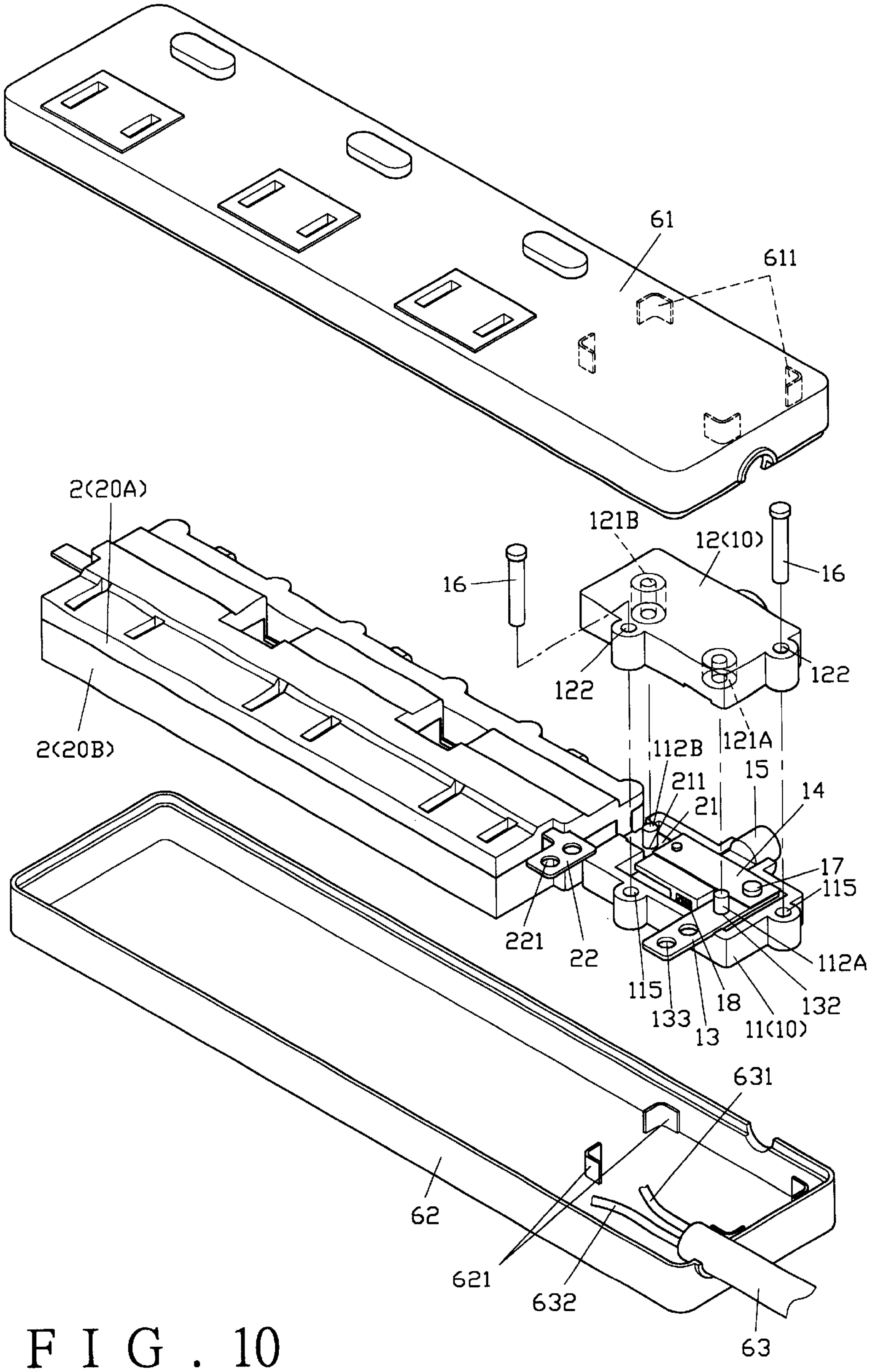
FIG. 10 is a schematic view of another fixing method for the overload protector of the present invention.
Figure 11:
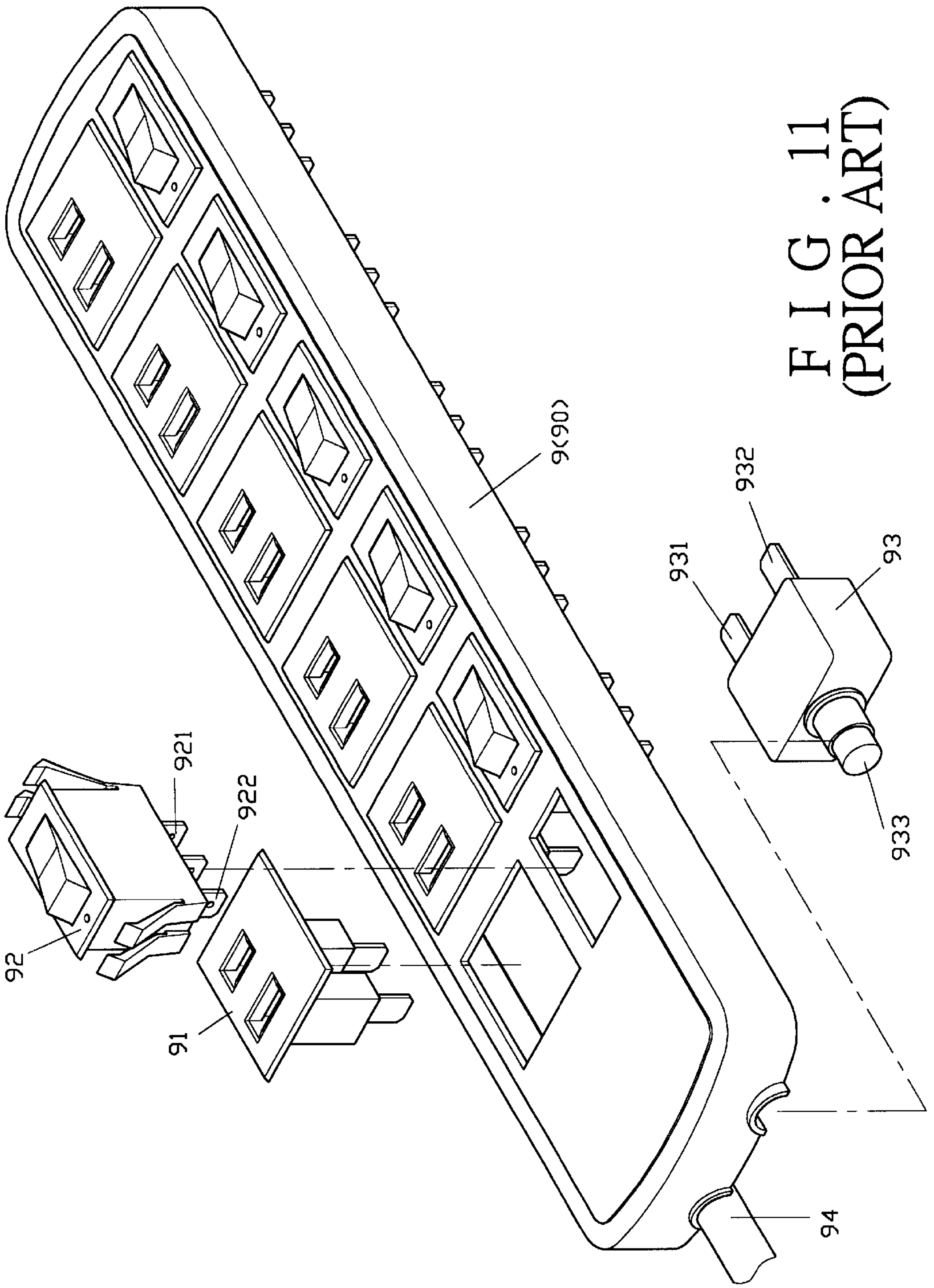
FIG. 11 (PRIOR ART)
FIG. 11 is a schematic view of assembling an overload protector of a conventional extension cord receptacle.
Figure 12:
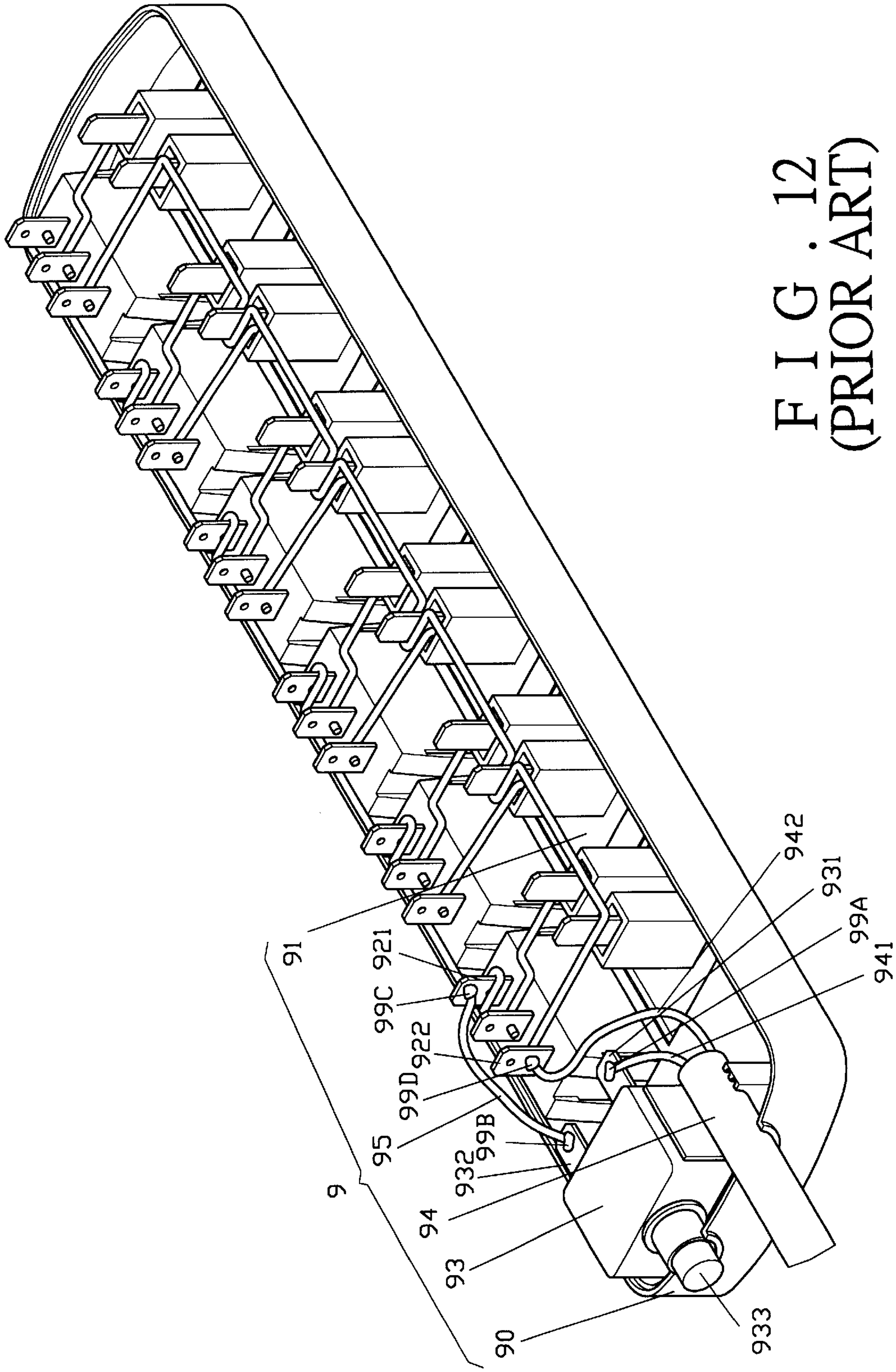
FIG. 12 (PRIOR ART)
FIG. 12 is a schematic view of a conventional extension cord receptacle using the soldering joints of the overload protector.

In addition, as shown in FIG. 10, the overload protector (1) can be fixed during assembling without the linking section (41), for example, position flanges (611, 621) can be preset according to the configuration of the overload protector (1) inside the upper and lower housing bodies (61, 62) of the extension cord receptacle. In assembling, the position flanges (611, 621) are utilized to limit the overload protector (1) and that also possesses the effectiveness of fixedly assembling the overload protector (1).

By virtue of the structure of the present invention, at least the following efficiency can be achieved:

1. The assembly becomes more convenient since no conducting lines are needed for connection between the receptacle unit and the overload protector.
2. The overload protector can be connected with other components rapidly via the linking section of the housing member thereof or can be secured by employing the position flanges of the upper and lower housing bodies of the extension cord receptacle to facilitate a convenient and rapid assembly.
3. The overload protector occupies reduced space and that it is favorable for designing a light and thin configuration for the extension cord receptacle.
4. The components of the overload protector are simplified so that the cost is reduced effectively.

I claim:

1. An overload protector structure of an extension cord receptacle comprising a fire wire conducting plate for one of a switch unit or a receptacle unit connected with the overload protector in the extension cord receptacle to extend therefrom; the overload protector having a power input plate exposed at a housing member thereof with a temperature sensing plate capable of bending upward when overheated and fixedly conjoined at an inner end of the power input plate, the temperature sensing plate having a free end with a contact point formed thereat, the housing member of the overload protector having a slot channel therein, the fire wire conducting plate extending into and lockingly engaging the housing member through said slot channel for positioning and contacting with the contact point of the temperature sensing plate in a normal state.

2. The overload protector structure of an extension cord receptacle according to claim 1, wherein said overload protector has a press-button, said press-button having a sheet-shaped isolating end and an exposed press section, the press-button being elastically biased by a spring, said sheet-shaped isolating end being biased to engage the contact point of the free end of the temperature sensing plate when in the normal state.

3. An overload protector structure of an extension cord receptacle comprising a fire wire conducting plate for one of a switch unit or a receptacle unit connected with the overload protector in the extension cord receptacle to extend therefrom; the overload protector having a power input plate exposed at a housing member thereof with a temperature sensing plate capable of bending upward when overheated and fixedly conjoined at an inner end of the power input plate. the temperature sensing plate having a free end with a contact point formed thereat, the overload protector having a slot channel, the fire wire conducting plate fittingly extending into said slot channel for positioning and contacting with the contact point of the temperature sensing plate in a normal state, a linking section being disposed unitarily on both the bodies of the overload protector and said one of the switch unit or the receptacle unit, the overload protector and said one of the switch unit or the receptacle unit being connected with each other via the respective linking sections thereof.

4. An overload protector structure of an extension cord receptacle comprising a fire wire conducting plate for one of a switch unit or a receptacle unit connected with the overload protector in the extension cord receptacle to extend therefrom; the overload protector having a power input plate exposed at a housing member thereof with a temperature sensing plate capable of bending upward when overheated and fixedly conjoined at an inner end of the power input plate, the temperature sensing plate having a free end with a contact point formed thereat, the overload protector having a slot channel, the fire wire conducting plate fittingly extending into said slot channel for positioning and contacting with the contact point of the temperature sensing plate in a normal state, the housing member of the overload protector being unitarily molded on the bodies of said one of the switch unit or the receptacle unit.

5. An overload protector structure of an extension cord receptacle comprising a fire wire conducting plate for one of a switch unit or a receptacle unit connected with the overload protector in the extension cord receptacle to extend therefrom; the overload protector having a power input plate exposed at a housing member thereof with a temperature sensing plate capable of bending upward when overheated and fixedly conjoined at an inner end of the power input plate, the temperature sensing plate having a free end with a contact point formed thereat, the overload protector having a slot channel, the fire wire conducting plate fittingly extending into said slot channel for positioning and contacting with the contact point of the temperature sensing plate in a normal state, the housing member of the overload protector being unitarily molded inside a housing member of the extension cord receptacle.

* * * * *